(12) United States Patent
Mukai et al.

(10) Patent No.: US 7,142,964 B2
(45) Date of Patent: Nov. 28, 2006

(54) ELECTRIC POWER STEERING CONTROL DEVICE

(75) Inventors: Yoshinobu Mukai, Wako (JP); Kyoji Hamamoto, Wako (JP); Hiroaki Horii, Wako (JP); Kazuhisa Watanabe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/648,929

(22) Filed: Aug. 27, 2003

(65) Prior Publication Data

US 2004/0073345 A1  Apr. 15, 2004

(30) Foreign Application Priority Data

Oct. 9, 2002 (JP) ............................. 2002-295925

(51) Int. Cl.
*A01B 69/00* (2006.01)

(52) U.S. Cl. ................... 701/41; 701/36; 180/410; 180/412; 180/421

(58) Field of Classification Search .................. 701/1, 701/36, 41–43; 180/410, 412–413, 421–422, 180/443–447
See application file for complete search history.

(56) References Cited

U.S. PATENT DOCUMENTS

| | | | | |
|---|---|---|---|---|
| 4,593,358 A | * | 6/1986 | Takeshima et al. | 701/41 |
| 4,626,994 A | * | 12/1986 | Yabe et al. | 701/41 |
| 5,608,635 A | * | 3/1997 | Tamai | 701/209 |
| 5,917,405 A | * | 6/1999 | Joao | 340/426.17 |
| 6,152,255 A | * | 11/2000 | Noro et al. | 180/446 |
| 6,594,569 B1 | * | 7/2003 | Yasuda | 701/41 |
| 6,643,572 B1 | * | 11/2003 | Kohge et al. | 701/41 |
| 6,665,598 B1 | * | 12/2003 | Nakano et al. | 701/41 |
| 6,711,483 B1 | * | 3/2004 | Kimura et al. | 701/41 |
| 6,728,609 B1 | * | 4/2004 | Murray et al. | 701/29 |
| 2003/0102181 A1 | * | 6/2003 | Tokumoto | 180/446 |
| 2003/0130777 A1 | * | 7/2003 | Iwazawa et al. | 701/41 |

FOREIGN PATENT DOCUMENTS

| | | |
|---|---|---|
| JP | 5-85378 | 4/1993 |
| JP | 08-067266 | 3/1996 |
| JP | 2002-120671 | 4/2002 |
| JP | 2002-144983 | 5/2002 |

\* cited by examiner

*Primary Examiner*—Gertrude A. Jeanglaude
(74) *Attorney, Agent, or Firm*—Hamre Schumann Mueller & Larson PC

(57) ABSTRACT

An electric power steering control device includes a memory. The memory is accommodated in the electric power steering control device mounted on a vehicle, and permits rewrite and storage of data. Transmitting a signal from an external of the vehicle allows the data stored in the memory to be rewritten.

2 Claims, 5 Drawing Sheets

ELECTRIC POWER STEERING CONTROL DEVICE

BACKGROUND OF THE INVENTION

The present invention relates to an electric power steering control device for easing steering effort of the driver in a vehicle wherein motor power is directly applied to the steering system.

Electric power steering apparatus includes an electric motor in a steering system, and assists steering effort of the driver by way of applying power from the electric motor (hereinafter referred to as assist steering force) under the control of a control device. During the steering operation of the driver, front wheels are turned by a steering shaft to change the direction of the vehicle. For example, Japanese Laid-open Patent Application No.8-67266 discloses a construction for easing steering effort of the driver, wherein an electric motor which generates assist steering force is arranged coaxially with a rack shaft and through a ball screw mechanism rotational driving force of the electric motor is converted into reciprocal movement of the rack shaft. The control device controls the output power of the electric motor with a steering torque input as a main input and with an electric motor driving signal output as an output. The electric motor driving signal indicates a voltage difference to be applied between terminals of the electric motor. The control device includes an H-bridge so that forward and reverse controls can be achieved by switching current flow directions of the H-bridge. The electric motor driving signal is controlled to be a desired value with pulse width modulation control (hereinafter referred to as PWM control) relative to the switch of the H-bridge. Accordingly, the control device controls the output power of the electric motor to assist and supply thrust of the rack shaft within the steering gear box.

However, in the conventional electric power steering apparatus, the control calculation method of the control device is stored in a ROM (see, for example, [0036] to [0046] of the aforementioned publication). In other words, the control device is manufactured as a dedicated control device for a specific steering gear box intended for the control. For this reason, if the control specification is varied in accordance with characteristics of the intended steering gear box and conditions of the vehicle into which the steering gear box is assembled, a large number of control devices have to be prepared for the respective specifications. This will cause the following drawbacks.

(1) In the case where specifications of steering gear boxes or vehicles are different, it is necessary to manufacture control devices each having own specification.

(2) In the case where electric power steering apparatus with different steering feelings are required, it is necessary to manufacture control devices each having special map data.

(3) In the case where there are differences in engine rotational speed according to specifications of engines of the intended vehicles or there are differences in specifications of vehicle speed signals according to the intended vehicles, it is necessary to manufacture a dedicated control device for each intended vehicle.

In view of the above, the present invention seeks to provide an electric power steering control device in which the control calculation method of the electric power steering control device can be readily changed.

SUMMARY OF THE INVENTION

According to a first aspect of the present invention, there is provided an electric power steering control device comprising: a memory which is accommodated in the electric power steering control device mounted on a vehicle, and which permits rewrite and storage of data, wherein transmitting a signal from an external of the vehicle allows the data stored in the memory to be rewritten. In the preferred embodiment to be described later, an EEPROM is provided in the control device, so that data of the EEPROM is rewritten by an external device signal.

With this electric power steering control device, even after the electric power steering control device is assembled with a vehicle, changing the memory data of the electric power steering control device enables adaptation for different control characteristics of the assist steering force and different kinds of steering gear boxes.

According to a second aspect of the present invention, the data stored in the memory is read out at a start-up of the electric power steering control device, and an assist steering force is controlled based on this data. In the preferred embodiment to be described later, a RAM is rewritten based on the data of the EEPROM at the start-up of the control device, and the assist steering force is controlled with reference to the RAM.

With this electric power steering control device, the contents of the memory can be utilized for controlling the assist steering force without requiring a special manipulation. In the preferred embodiment, the assist steering force can be controlled based on the contents of the memory. Even after rewriting the memory, the assist steering force can be controlled with the normal operation, such as reset (with the power being switched off and then switched on again) of the electric power steering control device, that is, turning on the ignition switch again.

According to a third aspect of the present invention, the electric power steering control device further comprises therein a ROM which stores a plurality of map data, and the memory stores label information corresponding to one of the plurality of map data. The label information is read out at a start-up of the electric power steering control device, followed by selection of the one map data in the ROM based on this label information to be read out. The assist steering force is controlled based on the selected map data. In the preferred embodiment to be described later, the ROM stores a plurality of assist maps each attached with own label information. When the control device starts up, a map utilized for the control is selected based on the label information written in the EEPROM.

With this electric power steering control device, even after the electric power steering control device is assembled with a vehicle, the electric power steering control device can be changed to different control characteristics of the assist steering force. The assist steering force can be controlled based on the control characteristics.

According to a fourth aspect of the present invention, the memory stores a set of constants or mathematical expression data, which is used for the electric power steering control device and is inherent in an individual specification. The set of constants or mathematical expression data is read out at a start-up the electric power steering device, and the assist steering force is controlled based on the set of constants or mathematical expression data. In the preferred embodiment to be described later, the EEPROM stores an NE (engine rotational speed) constant, a vehicle speed constant, and a torque constant, and a set of these constants is written on the RAM at the start-up of the control device.

With this electric power steering control device, likewise the above electric power steering control device, the NE constant, the vehicle speed constant, or the torque constant can be changed even after the electric power steering control device is assembled with a vehicle. The assist steering force can be controlled based on these constants.

Further, by the aforementioned advantage, it is possible to reduce the cost for the ROM mask accommodated in the CPU of the electric power steering control device. Also, it is possible to achieve cost down due to increase in the number of applicable kinds of vehicles.

BRIEF DESCRIPTION OF THE DRAWINGS

A preferred embodiment of the present invention will be described below, by way of example only, with reference to the accompanying drawings, in which.

DETAILED DESCRIPTION OF THE INVENTION

With reference to the accompanying drawings, one preferred embodiment of an electric power steering control device according to the present invention will be described.

<<Constructions of Electric Power Steering Apparatus and Control Device>

Figure 4:
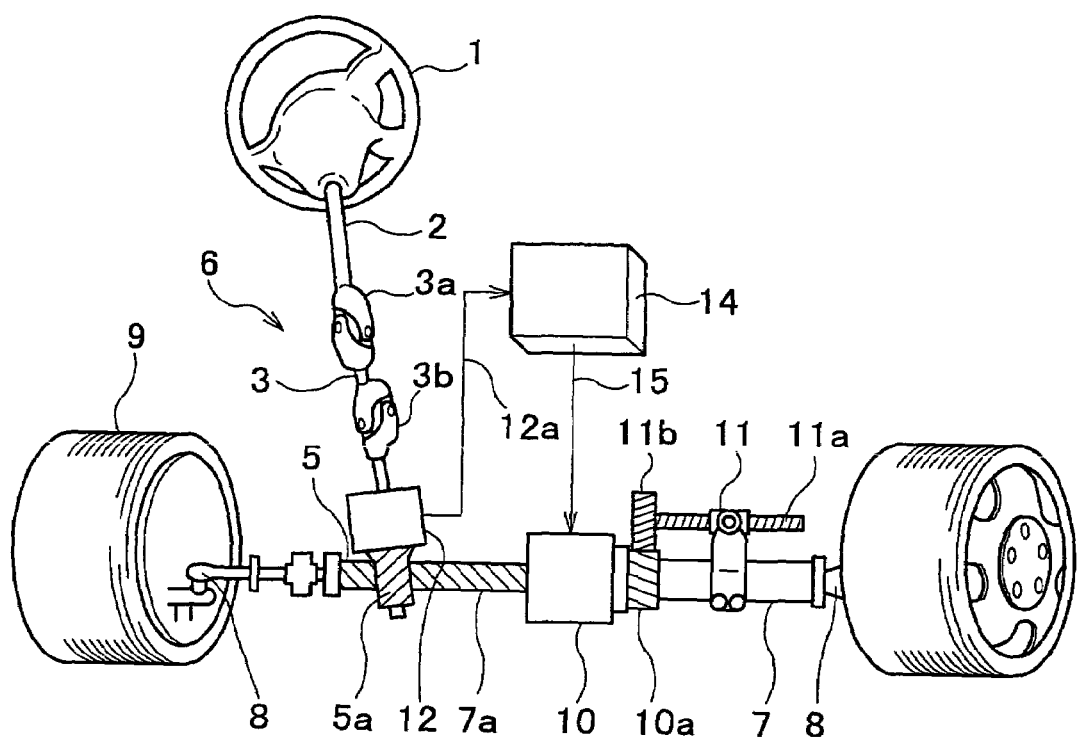
FIG. 4 is a view illustrating the whole arrangement of an electric power steering apparatus according to the present invention.
Figure 5:
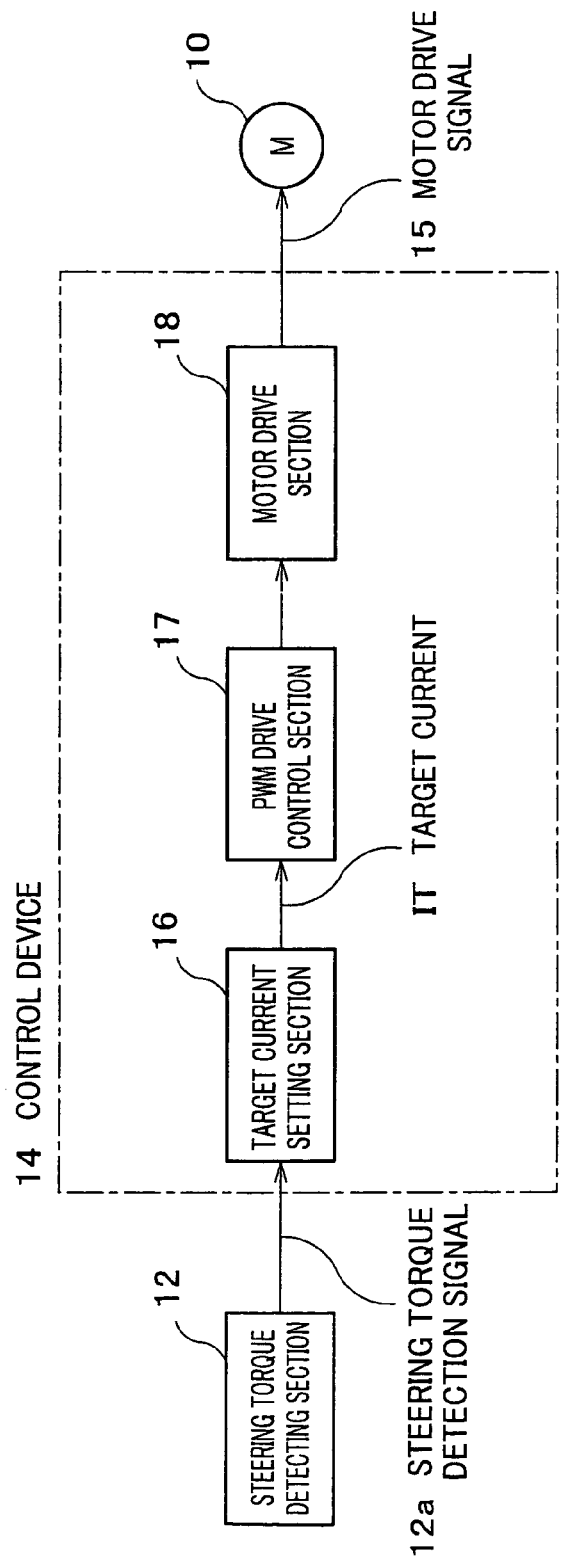
FIG. 5 is a block diagram illustrating the electric power steering control device.

Constructions of an electric power steering apparatus and a control device will be described with reference to FIGS. 4 and 5. As seen in the whole arrangement of the electric power steering apparatus shown in FIG. 4, a manual steering force generating section 6 is constructed such that a steering shaft 2 integral with a handle (steering wheel) 1 is connected via a connecting shaft 3 to a pinion 5a of a rack and pinion mechanism 5 positioned in a steering gear box. The connecting shaft 3 is provided with universal joints 3a, 3b at both ends thereof. The rack and pinion mechanism 5 includes a pinion 5a that meshes with rack teeth 7b formed on a rack shaft 7 so that a rotational movement of the pinion 5a is convened into an axial reciprocating movement of the rack shaft 7. Further, right and left front wheels 9 as steerable wheels are connected at both ends of the rack shaft 7 respectively via a tie rod 8. When the driver operates the handle 1, the vehicle changes the direction with the front wheels 9 turned through the steering shaft 2.

To ease the steering force generated at the manual steering force generating section 6, an electric motor 10 for generating assist steering force is positioned coaxially with the rack shaft 7. The electric power steering apparatus converts rotation of the electric motor 10 into thrust force of the rack shaft 7 via a ball-screw mechanism 11 arranged substantially parallel to the rack shaft 7. A helical gear 10a is integral with the rotor of the electric motor 10. The helical gear 10a meshes with a helical gear 11b that is integrally fixed to the shaft end of the screw shaft 11a of the ball-screw mechanism 11. The nut of the ball-screw mechanism 11 is joined with the rack shaft 7.

A steering torque detecting section 12 is provided in the steering gear box for detection of a manual steering torque T applied to the pinion 5a, and a steering torque detection signal 12a is transmitted to an electric power steering control device (hereinafter merely referred to as a "control device") 14. The steering torque detection signal 12a is inputted to the control device 14 as a main input signal, and the control device 14 outputs a motor drive signal 15 to control the output power of the electric motor 10. The motor drive signal 15 represents a voltage difference between terminals of the electric motor 10.

As shown in the block diagram illustrating the electric power steering control device, the control device 14 includes a target current setting section 16 which sets a target value of the current signal of the electric motor 10, a PWM drive control section 17 which processes a PWM control based on the target value, and a motor drive section 18 which drives the electric motor 10 by the PWM control of the PWM drive control section 17. The motor drive section 18 consists of an H-bridge, and controls the forward/reverse rotation of the electric motor 10 by switching the current flow directions of the H-bridge. The PWM drive control section 17 processes the PWM control with respect to the H-bridge, so that the motor drive signal 15 is controlled to a desired value. As a flow of the control, the target current setting section 16 determines the target current IT based on the steering torque detection signal 12a, and the PWM drive control section 17 processes the PWM control based on the target current IT. The motor drive section 18 then controls the output power of the electric motor 10 under the PWM control. As previously described, the steering torque detecting section 12 of the manual steering force generating section 6 (FIG. 4) detects the steering force of the driver, and the control device 14 controls the output power of the electric motor 10 to assist and supply the thrust of the rack shaft 7 (FIG. 4) positioned in the steering gear box.

<<Drive Control of Electric Motor by Rewriting Memory>>

Figure 1:
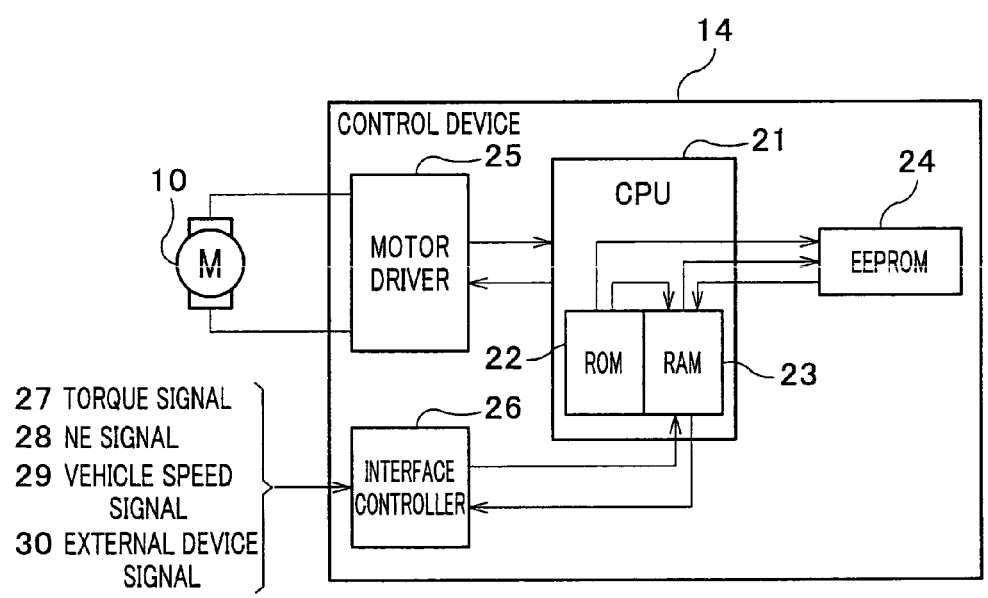
FIG. 1 is a block diagram illustrating a hardware configuration of an electric power steering control device according to the present invention.
Figure 2:
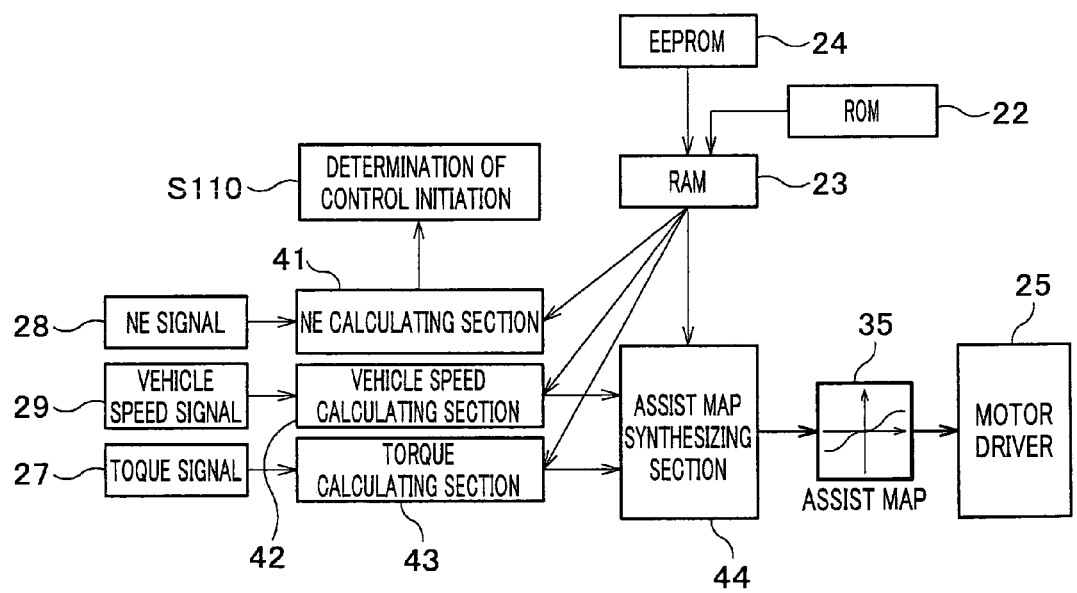
FIG. 2 shows a data flow of the electric power steering control device.
Figure 3:
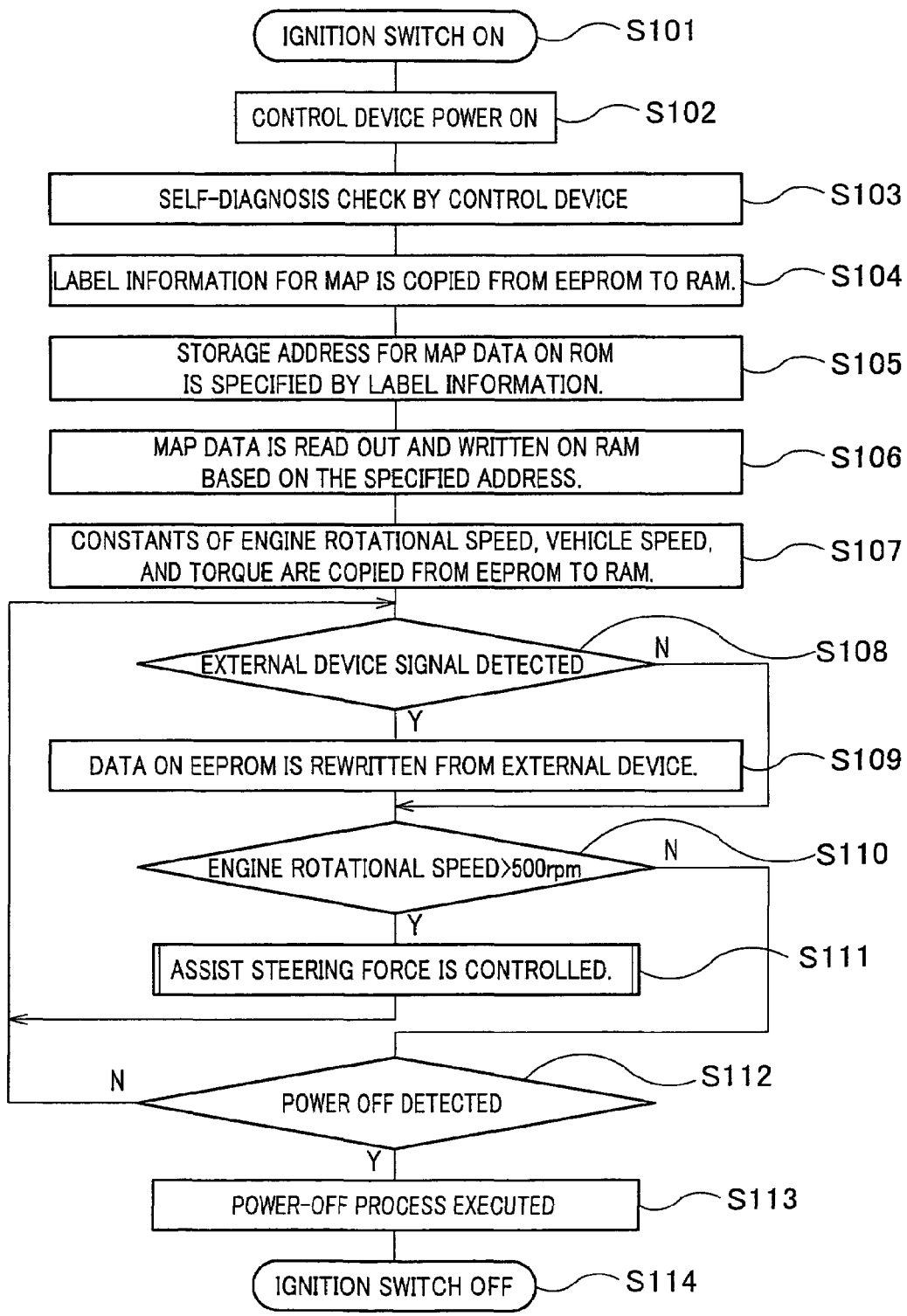
FIG. 3 is a flow chart showing the processing program of the electric power steering control device.

With reference to FIGS. 1 to 3, drive control of the electric motor by way of rewriting the memory will be described. FIG. 1 is a block diagram illustrating a hardware configuration of the electric power steering control device. The control device 14 consists of a CPU 21 which entirely controls the control device 14 and accommodates a ROM 22 and a RAM 23, an EEPROM 24 as are writable memory which can be rewritten by a signal from the external of the vehicle, a motor driver 25 which drives the electric motor 10 under control of the CPU 21, and an interface controller 26 which controls external signals. In the case where the control device 14 is mounted on a vehicle, the control device 14 is connected to a connecting line for inputs of a torque signal 27, an NE (engine rotational speed) signal 28, a vehicle speed signal 29, and an external device signal 30, respectively required for controlling the assist steering force. These signals are transmitted to the CPU 21 through the interface controller 26. The EEPROM 24 can be rewritten through the external device connecting line even with the control device per se. The EEPROM 24 is a non-volatile memory which permits rewrite and storage of data. The EEPROM 24 is one specific example of the memory defined in the claims. In the control device 14, the motor drive control can be achieved by the processing program that is incorporated into the ROM 22 built in the CPU 21.

FIG. 2 shows a data flow in the control device 14. When the pulse signal value of the NE signal 28 or the vehicle speed signal 29 should be converted into a physical value, it is necessary to convert the pulse signal value based on the specification of each engine or vehicle speed sensor. For this reason, a set of conversion values or conversion formulae corresponding to the engine specification or the vehicle speed sensor specification is written in the EEPROM 24, so that they can be referred to at the time of conversion. According to this construction, rewriting the EEPROM 24 enables one control device to be applied to vehicles with different engine specifications or different vehicle speed sensor specifications without replacing the control device. The conversion values or conversion formulae correspond to the "constants or mathematical expression data" defined in the claims.

When the control device 14 is applied to a vehicle, which specification is different according to type of the vehicle or its steering gear box (including the rack and pinion mechanism 5, etc. shown in FIG. 4), various kinds of map data and their label information are previously stored in the ROM 22 so that the map corresponding to the applied type of vehicle can be selected from the ROM 22 by referring to the corresponding label information of the data stored in the EEPROM 24. Accordingly, if only one kind of control device is manufactured, the same control device can be applied to vehicles with different vehicle kinds or different steering gear box specifications. Because the number of vehicles to which The same control device can be applied increases, the manufacturing cost can be decreased when compared with the case where dedicated control devices are manufactured for individual vehicles.

With reference to FIG. 2, operation of the processing program during the control of the assist steering force will be described by means of focusing a flow of the data after the start-up of the control device 14. In this instance, the control device 14 has risen to the steady state after turning on the switch, and a map data, an NE constant, a vehicle speed constant and a torque constant have been copied from the EEPROM 24 and stored in the RAM 23. Firstly, the current NE signal 28 is inputted into the control device 14 through the interface controller 26, and the NE constant is read out from the RAM 23. Based on these two input values, the NE calculating section 41 obtains a converted numerical value to determine whether the control is initiated. (Because such a process corresponds to step 5110 of FIG. 3, details thereof will be described with reference to explanations regarding FIG. 3.)

If conditions of the control initiation are satisfied, then control of the assist steering force is initiated.

The current vehicle speed signal 29 is inputted into the control device 14 through the interface controller 26 (FIG. 1) and the vehicle speed constant is read out from the RAM 23. Based on these two input values, the vehicle speed calculating section 42 obtains a vehicle speed conversion value. Similarly, the current torque signal 27 is inputted and the torque constant is read out from the RAM 23. Thereafter, the torque calculating section 43 calculates the torque conversion value. Next, the vehicle speed conversion value, the torque conversion value, and the map data on the RAM 23 are inputted into the assist map synthesizing section 44, and the assist map synthesizing section 44 synthesizes these data and outputs the synthesized data to the motor driver 25 as an assist map 35. The motor driver 25 drives the electric motor 10 (FIG. 1) based on the assist map 35 that is inputted from the assist map synthesizing section 44. Thereby, the electric motor 10 supplies assist steering force.

FIG. 3 is a flow chart showing the processing program of the control device. Operation of the processing program will be described below along the flow of FIG. 3 and with reference to FIGS. 1 and 2. When the driver turns on the ignition switch (step S101), the control device 14 is powered on (step S102), and then the control device 14 starts up. At first, a self-diagnosis check is carried out for each constituent element within the control device 14 (step S103). Thereafter, an initializing process is carried out for the data on the RAM 23. As a part of the initializing process, the map data is set from step S104 to step S106. To be more specific, label information for the map data that is stored in a specific address of the EEPROM 24 is read out, and is written on a specific address of the RAM 23 (step S104), followed by selection of the address where the map data on the ROM 22 is stored (step S105). Specifically, the label information per se may be utilized as a storage address of the map data. Alternatively, the label information may be utilized as a key data for collating with and retrieving the key data stored on top of the map data. In any case, it is possible to specify the address of one map data from a plurality of map data on the ROM 22 with the use of the label information. Based on the specified address, the corresponding map data is read out and is stored in the RAM 23 (step S106). As another initializing process, the NE constant, the vehicle speed constant, and the torque constant are read out from the EEPROM 24, and thereafter they are copied to the RAM 23 (step S107). By the foregoing steps, the start-up process of the control device 14 is completed and operation goes on the processing loop in the steady state (step S108 to step S112).

In the processing loop of the steady state, a check is carried out whether an external device signal 30 is detected (step S108). This is to confirm whether a data update demand for the EEPROM 24 is received through the interface controller 26 from the external of the vehicle. Herein, the data indicates the label information for the map data, the NE constant, the vehicle speed constant, and the torque constant, described in the initializing process. If the external device signal is detected, i.e. when the data update for the EEPROM 24 is demanded ("Y" in step S108), the contents of the EEPROM 24 are rewritten according to the demand (step S109). As the data update demand, the of the data to be updated and its update contents are designated. In the case of updating the data on the EEPROM 24 of the control device 14 mounted on a vehicle, the operator connects electric equipment such as a personal computer and an off-board diagnosis device to the control device 14 from the external of the vehicle, and transmits the data update demand for the EEPROM 24. Electric equipment and the control device may be connected directly by means of a specific interface cable. Alternatively, they may be connected through a network such as CAN communication.

Next, the control initiation conditions of the control device 14 are checked. Actually, a determination is made as to whether NE is greater than 500 rpm (step S110). If NE is greater than 500 rpm ("Y" in step S110), in the start-up process of the control device 14 the assist steering force is controlled based on the data written on the RAM 23 (step S111, see the description with respect to FIG. 2). Once the control is completed, operation returns to step S108 to check the external device signal. If NE is equal to or lower than 500 rpm by the result of checking the control initiation conditions ("N" in step S110), a confirmation is made as to whether the power of the control device 14 is off (step S112). In the case of "power-on" ("IN" in step S112) operation returns to step S108 to check the external device signal. In the case that "power-off" is detected ("Y" in step S112), the power-off process (power-off sequence) is executed by the stand-by power source (step S113) and the ignition switch is turned off (step S114).

In the above examples, the contents of the EEPROM 24 is reflected on the RAM 23 only in the case where the initializing process for the RAM 23 is carried out during the start-up process of the control device 14. Therefore, even if the data is rewritten in the process of the processing loop of the steady state after receiving a data update demand for the EEPROM 24 from the external of the vehicle (step S109), the assist steering force control based on this data is executed only after the control device 14 is reset with its power being turned off and on, that is, after the ignition switch is turned on again.

While the present invention has been described in detail with reference to specific embodiments thereof, it will be apparent to one skilled in the art that various changes and modifications may be made without departing from the scope of the claims. For example, "the memory which permits rewrite and storage of data" has been explained as an EEPROM, however, other known memory may be used. The label information of the map data, the NE constant, the vehicle speed constant, and the torque constant are written on the EEPROM. However, a part of them (for example, only the label information for the map data) may be written on the EEPROM and utilized. Further, in the above preferred embodiments, the map data on the ROM is selected with the use of a label written on the memory (for example, EEPROM) which permits rewrite and storage of data. However, if data can be read out from the memory at a high speed, or if there is no need to consider the read-out time, the map data on the ROM may be written on the memory (ROM without map data).

What is claimed is:

1. An electric power steering control device including:
    a memory which is accommodated in the electric power steering control device mounted on a vehicle, and which permits data to be rewritten and stored therein, wherein transmitting a signal from an external of the vehicle allows the data stored in the memory to be rewritten; and
    separate from the memory, a ROM including means for storing a plurality of map data for a plurality of different vehicles, the memory including means for storing label information corresponding to one of the plurality of map data;
    means for reading out the label information at a start-up of the electric power steering control device;
    means for selecting the one of the plurality of map data in the ROM based on this label information to be read out; and
    means for controlling an assist steering force based on the selected map data.

2. A method for initializing an electric power steering control device, having a memory which is accommodated in the electric power steering control device mounted on a vehicle, and which permits data to be rewritten and stored therein, wherein transmitting a signal from an external of the vehicle allows the data stored in the memory to be rewritten; and separate from the memory, a ROM which stores a plurality of map data for a plurality of different vehicles, wherein the memory stores label information corresponding to one of the plurality of map data, wherein the label information is read out at a stan-up of the electric power steering control device, followed by selection of the one map data in the ROM based on this label information to be read out, and wherein an assist steering force is controlled based on the selected map data; the method comprising:
    copying the label information for the selected map data from the ROM to the memory;
    selecting an address where the selected map data on the ROM is stored based on the label information;
    reading the selected map data from the ROM and storing the selected map data in the memory; and
    copying a set of constants or mathematical expression data from the ROM to the memory.

* * * * *